(12) United States Patent
Beck et al.

(10) Patent No.: US 12,337,530 B2
(45) Date of Patent: Jun. 24, 2025

(54) METHOD FOR CALIBRATING AN IRRADIATION DEVICE FOR AN APPARATUS FOR ADDITIVELY MANUFACTURING THREE-DIMENSIONAL OBJECTS

(71) Applicant: Concept Laser GmbH, Lichtenfels (DE)

(72) Inventors: Moritz Beck, Bamberg (DE); Christian Dicken, Weidenberg (DE)

(73) Assignee: Concept Laser GmbH, Lichtenfels (DE)

( * ) Notice: Subject to any disclaimer, the term of this patent is extended or adjusted under 35 U.S.C. 154(b) by 0 days.

(21) Appl. No.: 18/507,239

(22) Filed: Nov. 13, 2023

(65) Prior Publication Data

US 2024/0075682 A1    Mar. 7, 2024

Related U.S. Application Data

(62) Division of application No. 16/293,640, filed on Mar. 6, 2019, now Pat. No. 11,845,218.

(30) Foreign Application Priority Data

Dec. 11, 2018 (EP) ..................................... 18211595

(51) Int. Cl.
*B29C 64/153* (2017.01)
*B22F 10/31* (2021.01)
(Continued)

(52) U.S. Cl.
CPC ............ *B29C 64/153* (2017.08); *B22F 10/31* (2021.01); *B22F 12/45* (2021.01); *B29C 64/268* (2017.08);
(Continued)

(58) Field of Classification Search
CPC ..... B29C 64/153; B29C 64/268; B29C 64/30; B29C 64/393; B29C 64/188;
(Continued)

(56) References Cited

U.S. PATENT DOCUMENTS

2010/0125356 A1    5/2010  Shkolnik et al.
2015/0321426 A1*  11/2015  Lee ........................ B33Y 50/02
                                                                425/150
(Continued)

*Primary Examiner* — Alicia M. Choi
(74) *Attorney, Agent, or Firm* — Wood Herron & Evans LLP

(57) ABSTRACT

An apparatus for additively manufacturing three-dimensional objects by successive layerwise selective irradiation and consolidation of layers of a build material which can be consolidated by an energy beam, includes an irradiation device including a first and a second irradiation unit adapted to guide a first and a second energy beam. At least two first and two second calibration patterns are generated in at least two different first positions via the first energy beam and the at least two second calibration patterns are generated in at least two different second positions via the second energy beam and position information are determined relating to the positions of the at least two first and second calibration patterns and calibration information are generated relating to a calibration status of the irradiation device based on the determined position information.

19 Claims, 2 Drawing Sheets

Figure 1:
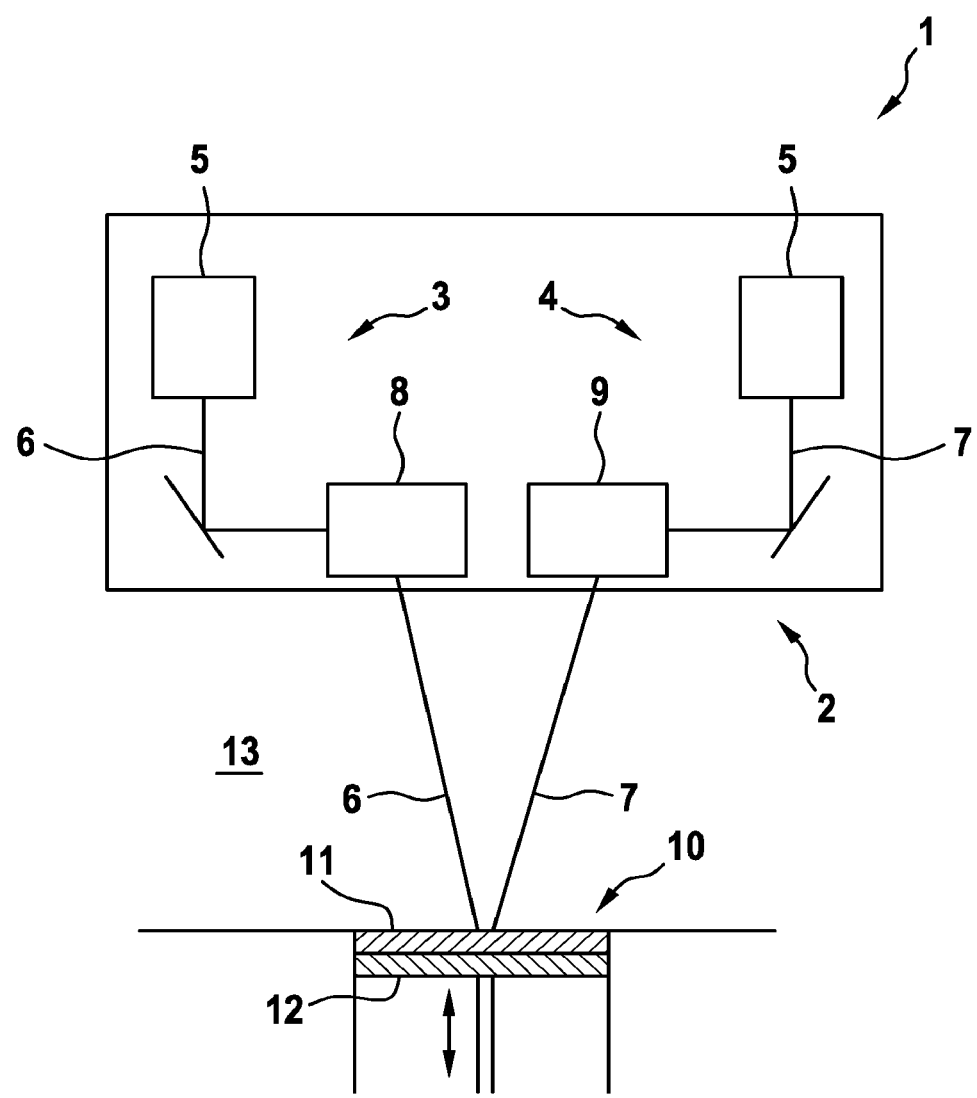

(51) Int. Cl.
  *B22F 12/45*   (2021.01)
  *B29C 64/268*  (2017.01)
  *B29C 64/30*   (2017.01)
  *B33Y 40/00*   (2020.01)
  *B22F 10/32*   (2021.01)
  *B22F 10/36*   (2021.01)

(52) U.S. Cl.
  CPC .............. *B29C 64/30* (2017.08); *B33Y 40/00* (2014.12); *B22F 10/32* (2021.01); *B22F 10/36* (2021.01)

(58) Field of Classification Search
  CPC ..... B29C 64/112; B29C 64/386; B22F 10/31; B22F 12/45; B22F 10/32; B22F 10/36; B33Y 40/00; B33Y 50/02; B33Y 30/00; B33Y 10/00; Y02P 10/25; G03F 7/70775; B41J 29/393
  See application file for complete search history.

(56) References Cited

U.S. PATENT DOCUMENTS

| | | |
|---|---|---|
| 2015/0367662 A1* | 12/2015 | Sender Beleta ..... B41J 2/04505 347/19 |
| 2018/0001568 A1 | 1/2018 | Sanchez Ribes et al. |
| 2018/0370146 A1* | 12/2018 | Domröse .............. B29C 64/277 |
| 2019/0037204 A1 | 1/2019 | Noda et al. |
| 2019/0047228 A1 | 2/2019 | Brown |
| 2019/0104295 A1 | 4/2019 | Wendel et al. |
| 2019/0118481 A1 | 4/2019 | Brown |
| 2019/0350513 A1 | 11/2019 | Carrein et al. |
| 2019/0387958 A1* | 12/2019 | Kimpe ................. A61B 5/0077 |
| 2020/0164588 A1* | 5/2020 | Vaes .................... B29C 64/153 |
| 2020/0261977 A1* | 8/2020 | Mamrak ............... B22F 10/366 |
| 2021/0001559 A1 | 1/2021 | Thiel |

\* cited by examiner

METHOD FOR CALIBRATING AN IRRADIATION DEVICE FOR AN APPARATUS FOR ADDITIVELY MANUFACTURING THREE-DIMENSIONAL OBJECTS

CROSS-REFERENCE TO RELATED APPLICATIONS

The present application is a divisional application of U.S. application Ser. No. 16/293,640 having a filing date of Mar. 6, 2019, which claims priority to European Patent Application serial no. 18 211 595.6 filed Dec. 11, 2018, the contents of each of which are incorporated herein by reference in their entirety as if set forth verbatim.

DESCRIPTION

The invention relates to a method for calibrating an irradiation device for an apparatus for additively manufacturing three-dimensional objects by means of successive layerwise selective irradiation and consolidation of layers of a build material which can be consolidated by means of an energy beam, which irradiation device comprises at least a first and a second irradiation unit adapted to guide at least a first and a second energy beam.

Apparatuses for additively manufacturing three-dimensional objects and methods for calibrating the same or calibrating components of the apparatus are generally known from prior art. For example, it is known from prior art that calibrating the irradiation device that is used during an additive manufacturing processes for (selectively) irradiating and thereby consolidating the build material is essential for meeting quality requirements in additive manufacturing processes. For example, it is known to determine, whether each irradiation unit of the irradiation device, e.g. comprising a beam scanner, guides the respective energy beam to the correct nominal position or whether a deviation from a nominal position occurs. Such deviations may lead to errors in the object, e.g. stitching errors in case regions irradiated via a first irradiation unit and regions irradiated via a second irradiation unit at least partially overlap or are arranged adjacent to each other and the energy beams are not properly guided.

Usually, a calibration pattern is generated in/on a test specimen, e.g. irradiated, and the actual position of the calibration pattern relative to a nominal position of the calibration pattern is determined. In particular, it is known to irradiate a first cross as a first calibration pattern via a first irradiation unit and a second cross as a second calibration pattern via a second irradiation unit, wherein the first and second calibration pattern are generated in the same position. Subsequently, deviations between the positions of the two crosses can be determined and thereby, derived, whether both irradiation units are properly calibrated or whether a deviation between the irradiation units, e.g. the coordinate systems of the irradiation units, occurs. Such calibration patterns that are irradiated to the same position have to be analyzed thoroughly, e.g. under a microscope by service personnel. Further, oftentimes it is hard to distinguish which of the crosses has been irradiated via which irradiation unit. Therefore, the calibration methods currently used are cumbersome and time-consuming, wherein an automated determination process and calibration process is not available.

It is an object of the present invention to provide an improved method for calibrating an irradiation device, wherein preferably an automated calibration process is provided and a calibration of the irradiation device over a wide area, e.g. a whole build plane, is possible.

The object is inventively achieved by a method according to claim 1. Advantageous embodiments of the invention are subject to the dependent claims.

The method described herein is a method for calibrating an irradiation device for an apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electron beam. A respective build material can be a metal, ceramic or polymer powder. A respective energy beam can be a laser beam or an electron beam. A respective apparatus can be an apparatus in which an application of build material and a consolidation of build material is performed separately, such as a selective laser sintering apparatus, a selective laser melting apparatus or a selective electron beam melting apparatus, for instance.

The apparatus may comprise a number of functional units which are used during its operation. Exemplary functional units are a process chamber, an irradiation device, as described before, which is adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

As described before, the invention relates to a method for calibrating an irradiation device for an apparatus for additively manufacturing three-dimensional objects. Such an irradiation device may, as described before, comprise at least two irradiation units, e.g. adapted to guide a first and a second energy beam, e.g. laser beams, with corresponding beam guiding elements, such as scanners, preferably movable mirror elements. The invention is based on the idea that at least two first and two second calibration patterns are generated, wherein the at least two first calibration patterns are generated in at least two different first positions via the first energy beam and the at least two second calibration patterns are generated in at least two different second positions via the second energy beam. Subsequently, position information can be determined which position information relate to the positions of the at least two first and second calibration patterns, wherein based on the determined position information calibration information can be generated that relate to a calibration status of the irradiation device.

In other words, it is possible to generate at least two, in particular multiple, first and second calibration patterns via the at least two irradiation units of the irradiation device. Afterwards, it is possible to determine the positions of the individual calibration patterns, e.g. the first calibration patterns that have been generated via the first irradiation unit guiding the first energy beam and the second calibration patterns that have been generated via the second irradiation unit guiding the second energy beam. As the individual calibration patterns are generated in different positions and therefore, do not overlap or are not generated in the same position, it is possible to distinguish between the individual calibration patterns and therefore, the determination and calibration process is facilitated and can preferably be automated.

Based on the position information that relates to the position of the individual calibration patterns, it is possible to derive calibration information that indicates whether the irradiation device is properly calibrated or whether a deviation between the nominal positions and the actual positions of the individual calibration patterns occurs. Thus, it is possible to assure that the calibration status that can be derived from the calibration information based on the determined position information indicates, whether a calibration of the determination device is necessary or whether the irradiation device is already properly calibrated. Thus, it is possible to assure that each irradiation unit is adapted to properly guide the energy beam across the build plane, in particular that defined nominal positions and accuracies are met and that no deviations between the nominal positions and the actual positions of the energy beams occur during an additive manufacturing process. Therefore, it is possible to avoid or prevent positioning errors, such as stitching errors, during the additive manufacturing process.

The inventive method may further be improved in that at least one parameter, preferably an irradiation parameter, of one of the irradiation units may be adjusted dependent on the generated calibration information. Thus, it is possible to generate the calibration information, as described before, that relates to the calibration status of the irradiation device. For example, if a deviation occurs, e.g. one of the calibration patterns is not generated in the correct nominal position, a corresponding irradiation parameter of the irradiation unit used to guide the energy beam to generate the calibration pattern, can be adjusted. For example, it is possible to use other irradiation parameters relating to the guidance of the energy beam, for example based on which the beam guiding unit of one of the irradiation units is controlled.

According to a preferred embodiment of the inventive method, multiple first and second calibration patterns may be generated in defined first and second positions two-dimensionally distributed across a test specimen, preferably equidistantly distributed. According to this embodiment, it is possible to distribute the first and second calibration patterns two-dimensionally across a test specimen, wherein the individual first and second calibration patterns are generated in defined first and second positions. Preferably, the individual calibration patterns are equidistantly distributed two-dimensionally across the test specimen. As test specimen any arbitrary suitable material or surface can be used, e.g. a test specimen made from a metal sheet, e.g. aluminum, or a glass plate with (color) paint, a laser marking tape or anodized aluminum plates, for instance. By generating multiple first and second calibration patterns distributed across the test specimen, it is possible to generate position information and determine the calibration information across the entire test specimen, e.g. resembling the size of the build plane and therefore, assuring that the calibration of the irradiation device is properly performed for any arbitrary position in the build plane.

Further, it is possible to determine at least two sets of position information each relating to the position of at least two first and/or second calibration patterns and/or relating to a relative position between at least one first and at least one second calibration pattern, based on the same pattern series, in particular generated in the same process. Thus, it is possible to determine two sets of position information based on the same pattern series, wherein the two sets of position information may each relate to the position of at least two first and/or second calibration patterns and/or may relate to a relative position between at least one first and at least one second calibration pattern. Thus, it is advantageously possible, to generate multiple calibration patterns, e.g. at least two first and second calibration patterns, wherein position information may be determined indicating whether the at least two first or at least two second calibration patterns are arranged in defined relative positions, e.g. spaced apart from each other by a defined relative distance. Of course, other arrangements leading to a defined relative position of the calibration patterns are also feasible, e.g. scaled, rotated, skewed or otherwise distorted patterns.

It is also possible to determine the relative position between the first and the second calibration pattern or every first and second calibration pattern. Thus, a determination can be made, whether the first calibration patterns that are generated via the first irradiation unit and the second calibration patterns that are generated via the second irradiation unit are arranged in their nominal positions, e.g. spaced away from each other by a defined relative distance or whether stitching errors occur. It is particularly preferred that the calibration patterns are generated in the same process, e.g. during the same irradiation step and the corresponding position information is also determined in the same process step in that position information relating to the position of the first calibration patterns and other position information relating to the position of the second calibration patterns or the relative position between the first and the second calibration patterns can be determined in the same determination process step.

According to another embodiment of the inventive method, a reference position may be defined and the position for the at least one first and second calibration pattern may be determined relative to the reference position and a deviation information may be determined relating to a deviation between the determined first and second position and nominal first and second positions. Thus, it is possible to arbitrarily define a reference position relative to which the individual positions, in particular first and second positions, of the first and second calibration patterns can be determined. The reference position may be any arbitrary position on the test specimen, e.g. the first position of the first calibration pattern, wherein, of course any arbitrary other calibration pattern, e.g. one of the second calibration patterns, a reference marker on the test specimen, e.g. the center of the test specimen, or the like, can be defined as reference position. Hence, the actual positions of the calibration patterns may be determined with respect to the reference position and therefore, it is possible to determine deviations between the actual positions of the calibration patterns and nominal positions of the calibration patterns in which they should be generated, if the irradiation device is properly calibrated.

The calibration patterns, namely the at least one first and the at least one second calibration pattern can be of any arbitrary shape or geometry. The at least one first or second calibration pattern may, inter alia, comprise a cross or a circle or a triangle or a line or a rectangle or an octagon or an ellipsis or an L-shaped pattern or a dot. Of course, the first and the second calibration patterns may be composed of an arbitrary combination of different shapes and/or geometries. However, it is particularly preferred that each calibration pattern comprises at least one reference marker, e.g. the branch of a cross or an edge of a triangle or a rectangle, relative to which it is possible to determine the position of the first or second calibration pattern or adjacent first or second calibration patterns. A geometry may be chosen that simplifies the determination process, e.g. via visual inspection or via a corresponding determination unit.

Further, the at least one first and second calibration patterns may be identical or different. Hence, it is possible that the first calibration patterns comprise a different shape or geometry than the second calibration patterns, wherein distinguishing between the two types of calibration patterns can be simplified using different geometries or different shapes for the different calibration patterns. For example, it is possible that the same geometry, e.g. a triangle, cross or circle is used, but different shapes, such as wider lines of the branches of a cross or the edges of a rectangle or the like, can be used for the different calibration patterns. Of course, it is also possible that for the first and second calibration patterns identical geometries and shapes are used.

According to another preferred embodiment of the inventive method, the calibration status may be determined visually or via a determination unit, preferably by determining at least one determination section, in particular a gap, between two adjacent first and second calibration patterns. Hence, as described before, it is possible that the calibration status of the irradiation device can be derived visually or determined via a determination unit. Advantageously, it is possible that service personnel may visually determine the calibration status of the irradiation device by analyzing the generated calibration patterns via eye inspection. It is also possible that the determination unit is used to determine the calibration status of the irradiation device, e.g. by automatically determining the position information of the calibration patterns on the test specimen and thereby generating the calibration information, as described before.

It is particularly preferred that at least one determination section is determined that is formed by at least two adjacent first and second calibration patterns, for example a gap arranged between a first and a second calibration pattern. The gap may be chosen in that two adjacent calibration patterns generated via a properly calibrated irradiation device are spaced away from each other by the gap, wherein the gap simplifies the determination process, as merely the size of the gap has to be determined, wherein a positioning error is directly linked with a deviation from a nominal gap size.

Further, the size of the gap between two facing branches of the first and a second calibration pattern and/or the relative position and/or orientation of two facing branches of an adjacent first and second calibration pattern can be determined. In other words, it is possible to choose the geometry of the first and second calibration patterns in that they comprise at least one branch, each, that faces the other calibration pattern. For example, each calibration pattern may be shaped as a cross comprising four branches facing towards the surrounding calibration patterns in the two-dimensional distribution on the test specimen, as described before. By determining the size of the gap between each two facing branches of the calibration patterns that are arranged adjacent to each other and/or the relative position and/or the orientation of two of those facing branches, it is possible to determine the calibration status of the irradiation device. For example, the relative position of the calibration patterns can be determined by determining the gap size, wherein displacements can be identified by looking at the relative position of the branches, such as the alignment of the branches. It is also possible to derive rotational errors of the irradiation device, e.g. by determining the orientation of the two facing branches, e.g. whether there is an angle enclosed by the two facing branches, in particular deviating from 0° or 180°, respectively.

As described before, it is possible to determine the position information via a determination unit, preferably a coordinate measuring unit and/or a scanning unit, in particular a camera. Thus, it is particularly preferred that the determination of the position information is performed automatically, e.g. by scanning the individual positions of the calibration patterns on the test specimen. For example, it is possible to use a coordinate measuring unit to determine the actual positions of the individual calibration patterns and compare the actual positions with the nominal positions. It is particularly preferred that the determination process in which the positions of the calibration patterns are determined can be performed in one determination step, e.g. by previously irradiating the individual calibration patterns on the test specimen and subsequently determining the position information for each calibration pattern.

According to another embodiment, a pattern series can be generated which comprises at least two first and at least two second calibration patterns, wherein the at least two first and second calibration patterns are arranged in a line, preferably alternatingly. Hence, the at least two first and the at least two second calibration patterns can be arranged on a common line, e.g. in the same row or column, on the test specimen, wherein each calibration pattern is arranged in a defined position. For example, it is possible to alternatingly arrange the first and the second calibration patterns in that at least one first calibration pattern is surrounded by adjacent second calibration patterns and vice versa. Thus, it is possible to simplify the determination process, as the position information for the first calibration patterns and the second calibration patterns can be determined and the relative position to the adjacent other calibration patterns can be determined. Hence, it is possible to derive whether the individual calibration patterns are arranged in the correct nominal position or whether a deviation occurs.

It is also possible to generate a two-dimensional pattern series, preferably comprising multiple pattern series, wherein the first and second calibration patterns are arranged alternatingly in two directions. As described before, it is possible that in the pattern series the first and the second calibration patterns are arranged alternatingly, wherein in the two-dimensional pattern series the calibration patterns are arranged alternatingly in two dimensions. Hence, except from the calibration patterns that are arranged on the edges of the two-dimensional pattern series, each calibration pattern is surrounded by calibration patterns of the other type, wherein, for example with respect to the branches or other reference markers of the calibration patterns, it is possible to directly determine whether the calibration patterns are properly positioned and oriented or if a deviation occurs that requires a calibration of the irradiation device.

As described before, it is possible to determine position information which generally relates to the positions of the first and/or the second calibration patterns. In particular, the position information may be or may relate to an overlap of the irradiation regions of the at least two irradiation units and/or an orientation of at least one irradiation unit and/or a position of at least one calibration pattern and/or a rotation of an irradiation region of at least one irradiation unit and/or a distortion of an irradiation region of at least one irradiation unit and/or a scaling of an irradiation region of at least one irradiation unit.

Of course, it is also possible that the position information may relate to a deviation of each of the previously mentioned parameters/properties, e.g. a deviation from a nominal overlap of the irradiation regions of the at least two irradiation units. Hence, the position information may indicate whether the calibration patterns are generated in the proper nominal position or whether a calibration of the irradiation device has to be performed. In particular, the position information may indicate whether an overlap of the irradiation regions of the at least two irradiation units is properly adjusted, i.e. the regions in which each irradiation unit is adapted to guide the corresponding energy beam.

Further, an orientation of at least one irradiation unit and/or a rotation of an irradiation region of at least one irradiation unit can be derived from the position information. It is also possible that occurring distortions of irradiation regions caused by one or both irradiation units can be derived and that the scaling of an irradiation region can be adjusted correctly, e.g. a different scaling between the two irradiation regions of the two irradiation units can be identified. Hence, it is possible that the position information relates to various parameters that may directly influence the calibration of the irradiation device. As these parameters may be determined by determining the position information, it is possible to assure that the irradiation device is properly calibrated or if a deviation from one of the nominal parameters comprised in the position information is identified, a proper calibration of the irradiation device can be performed.

Thus, it is possible to generate correction parameters based on which a calibration of at least one parameter of the irradiation device, in particular an irradiation parameter of at least one irradiation unit, can be performed. Therefore, it is possible that by performing the steps of determining the position information and generating the calibration information, the corresponding correction parameters can be generated that are used to perform the calibration process. For example, if a deviation from a nominal parameter is identified, the corresponding correction parameter can be generated that allows for calibrating the irradiation device in that the nominal value of the corresponding parameter can be met after the calibration.

Besides, the invention relates to an apparatus for additively manufacturing three-dimensional objects by means of successive layerwise selective irradiation and consolidation of layers of a build material which can be consolidated by means of an energy source, which apparatus comprises an irradiation device with at least a first and a second irradiation unit adapted to guide at least a first and a second energy beam, wherein the apparatus comprises a calibration unit adapted to generate at least two first and two second calibration patterns, wherein the at least one first calibration patterns are generated in at least two different first positions via the first energy beam and the at least two second calibration patterns are generated in at least two different second positions via the second energy beam and adapted to determine position information relating to the positions of the at least two first and second calibration patterns and adapted to generate calibration information relating to a calibration status of the irradiation device based on the determined position information.

Self-evidently, all features, details and advantages described with respect to the inventive method are fully transferable to the inventive apparatus. In particular, the inventive method may be performed on the inventive apparatus to calibrate the irradiation device of the inventive apparatus.

Exemplary embodiments of the invention are described with reference to the Fig.

Figure 2:
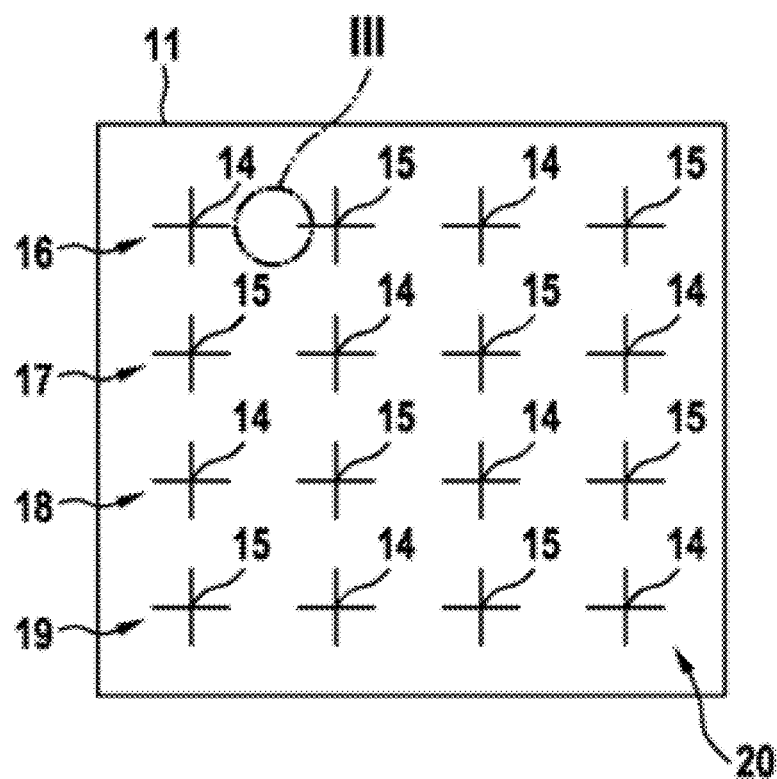
Figure 3:
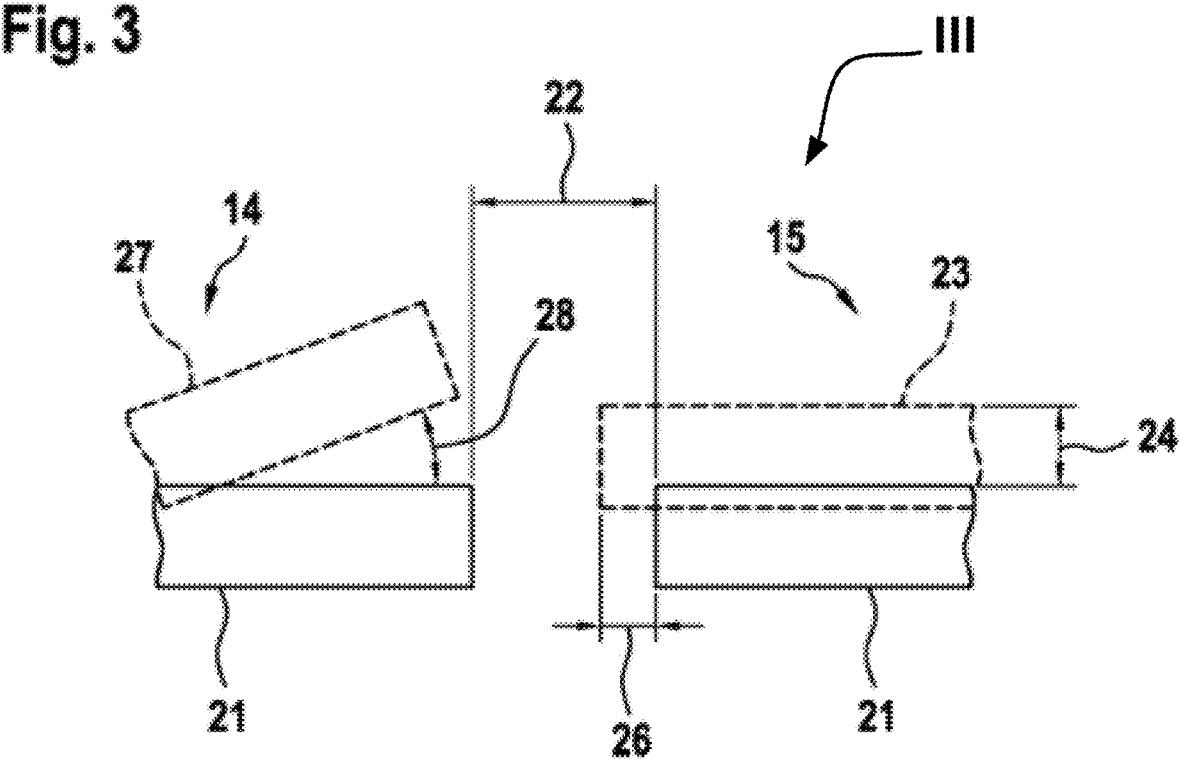

The Fig. are schematic diagrams, wherein
FIG. 1 shows an inventive apparatus;
FIG. 2 shows a top view on a test specimen; and
FIG. 3 shows a detail III-III from FIG. 2.

FIG. 1 shows an apparatus 1 for additively manufacturing three-dimensional objects, wherein in a regular mode of operation of the apparatus 1 the three-dimensional objects can be manufactured by selective irradiation and consolidation of layers of a build material via an energy source. The apparatus 1 comprises an irradiation device 2 with two irradiation units 3, 4, wherein each irradiation unit 3, 4 comprises an energy source 5, e.g. a laser source adapted to generate an energy beam 6, 7, preferably a laser beam. In other words, the first irradiation unit 3 is adapted to guide the energy beam 6, e.g. via a first beam guiding unit 8, whereas the second irradiation unit 4 is adapted to guide the second energy beam 7 via a second beam guiding unit 9 across a build plane 10 in which for the purpose of calibrating the irradiation device 2 a test specimen 11 is arranged.

In this exemplary embodiment, the test specimen 11 is carried via a build plate 12 via which in a regular mode of operation non-consolidated build material and the object are height-adjustably carried. Of course, the test specimen 11 can be arranged in any other arbitrary position in a process chamber 13, i.e. the chamber in which the additive manufacturing process is performed in a regular mode of operation. Self-evidently, the inventive method is not restricted to the specific embodiment as depicted in FIG. 1, but the inventive method may be performed on any arbitrary additive manufacturing apparatus 1 comprising an irradiation device 2 independent of the specific setup inside the process chamber 13.

For performing the inventive method for calibrating the irradiation device 2 of the apparatus 1, at least two first and second calibration patterns 14, 15 (FIG. 2), in particular multiple first and second calibration patterns 14, 15 are generated on the test specimen 11. For the sake of simplicity, only four calibration patterns 14, 15 are generated as pattern series 16 arranged in a common line on the test specimen 11. Of course, an arbitrary number of calibration patterns 14, 15 can be arbitrarily arranged on the test specimen 11. In this exemplary embodiment, the calibration patterns 14, 15 are arranged alternatingly in the pattern series 16.

As can further be derived from FIG. 2, a two-dimensional pattern series 20 is generated comprising pattern series 16-19. Hence, the calibration patterns 14, 15 may be two-dimensionally distributed across the test specimen 11 via the individual pattern series 16-19 forming the two-dimensional pattern series 20. Thus, each calibration pattern 14, 15 is neighbored by two, three or four calibration patterns 14, 15 of the other type. As described before, the calibration patterns 14 are generated via the first irradiation unit 3 guiding the first energy beam 6 across the test specimen 11 and the second calibration patterns 15 are generated via the second irradiation unit 4 guiding the second energy beam 7 across the test specimen 11.

Although, the calibration patterns 14, 15 are shaped as crosses in this exemplary embodiment, any arbitrary shape or geometry can be used for the calibration patterns 14, 15. After the calibration patterns 14, 15 have been generated on top of the test specimen 11, it is possible to determine position information of the calibration patterns 14, 15. For example, it is possible to derive position information via eye inspection, by comparing the positions of the calibration patterns 14, 15. It is also possible to use a determination unit (not shown) that is adapted to determine the positions or the relative positions or deviations thereof of the individual calibration patterns 14, 15.

As the calibration patterns 14, 15 are crosses comprising branches 21, each calibration pattern 14, 15 has at least two neighboring calibration patterns 14, 15 of the other type, wherein two branches 21 of two different calibration patterns 14, 15 face each other. FIG. 3 shows two facing branches 21 of two different calibration patterns 14, 15 as depicted via the dashed circle in FIG. 2. Between the two facing branches 21 a gap 22 is enclosed, wherein it is possible to determine the size of the gap 22 for determining the position information. For example, it is possible to determine whether the gap 22 has a defined size or whether a displacement of one of the branches 21 occurs relating to a positioning error of one of the irradiation units 3, 4 corresponding to whatever branch 21 is not in the nominal position.

For example, two positioning errors are depicted in FIG. 3, wherein a dotted line 23 depicts a spatial positioning error, wherein the calibration pattern 15, in particular the branch 21 of the calibration pattern 15 is displaced by a distance 24 in one direction and by a distance 26 in a second direction, for example in x-direction and y-direction. By determining the relative position of the calibration patterns 14, 15, in particular the facing branches 21, it is possible to determine whether the calibration patterns 14, 15 have been generated in the correct nominal position or whether a deviation occurs.

By deriving the position information it is possible to generate a calibration information relating to whether the irradiation device 2 is properly calibrated or whether a calibration is necessary. In the case of the dotted line 23 a calibration is necessary, as a deviation from a nominal position of the calibration pattern 15 occurs. Thus, it is possible to generate correction parameters that allow for correcting the second irradiation unit 4 in that the calibration pattern 15 can be generated in the proper nominal position.

Via a dashed line 27 a rotational error is depicted, wherein the calibration pattern 14 is rotated through an angle 28 relative to the nominal position. As described before, it is possible to determine the orientation between the two calibration patterns 14, 15, in particular the facing branches 21, if the angle 28 is determined, a calibration of the irradiation device 2 can be deemed necessary. Based on the position information that can be determined from the facing branches 21 it is possible to generate correction information allowing for performing a calibration process.

Hence, the inventive method may be performed on the inventive apparatus 1.

The invention claimed is:

1. An apparatus for additively manufacturing three-dimensional objects by means of successive layerwise selective irradiation and consolidation of layers of a build material which can be consolidated by means of an energy source, the apparatus comprising:
   an irradiation device with at least a first and a second irradiation unit, wherein the first irradiation unit is configured to generate a plurality of first calibration patterns with a first energy beam at respectively different first locations of a test specimen, and wherein the second irradiation unit is configured to generate a plurality of second calibration patterns with a second energy beam at respectively different second locations of the test specimen; and
   a determination unit configured to determine position information pertaining to the respective positions of the plurality of first calibration patterns and the plurality of the second calibration patterns, wherein the position information comprises a gap between (i) a first one of the plurality of first calibration patterns and (ii) a second one of the plurality of second calibration patterns, wherein the first one of the plurality of first calibration patterns is adjacent to the second one of the plurality of second calibration patterns, and wherein, based at least in part on the position information, the determination unit is configured to determine a calibration status of the irradiation device; and
   wherein the apparatus is configured to adjust, for use in an additive manufacturing process, at least one irradiation parameter associated with the irradiation device based at least in part on the calibration status.

2. The apparatus of claim 1, wherein the plurality of first calibration patterns define at least part of a first pattern series, and wherein the plurality of second calibration patterns define at least part of a second pattern series.

3. The apparatus of claim 1, wherein the plurality of first calibration patterns are arranged in a first line, and wherein the plurality of second calibration patterns are arranged in a second line.

4. The apparatus of claim 1, wherein the plurality of first calibration patterns and the plurality of second calibration patterns are arranged in an alternating sequence.

5. The apparatus of claim 1, wherein the plurality of first calibration patterns and the plurality of second calibration patterns are arranged in a first line having a first orientation and a second line having a second orientation that differs from the first orientation.

6. The apparatus of claim 5, wherein the first orientation corresponds to an x-direction in a coordinate system and the second orientation corresponds to a y-direction in the coordinate system.

7. The apparatus of claim 1, wherein the plurality of first calibration patterns and the plurality of second calibration patterns are distributed equidistantly or non-equidistantly across the test specimen.

8. The apparatus of claim 1, wherein the plurality of first calibration patterns and the plurality of second calibration patterns are generated in a same process.

9. The apparatus of claim 1, wherein the determination unit is configured to:
   determine the position information pertaining to a first respective one of the plurality of first calibration patterns relative to a reference position; and
   determine the position information pertaining to a second respective one of the plurality of second calibration patterns relative to the reference position.

10. The apparatus of claim 9, wherein the determination unit is configured to determine deviation information pertaining to a deviation between the reference position and the position information.

11. The apparatus of claim 1, wherein at least one of the plurality of first calibration patterns comprises, and/or wherein at least one of the plurality of second calibration patterns comprises: a cross, a circle, a triangle, a line, a rectangle, an octagon, an ellipses, an L-shaped pattern, or a dot.

12. The apparatus of claim 1, wherein at least one of the plurality of first calibration patterns comprises a first shape, and/or wherein at least one of the plurality of second calibration patterns comprises a second shape, wherein the first shape is different from the second shape.

13. The apparatus of claim 1, wherein the gap is located between a first branch of the first one of the plurality of first calibration patterns and a second branch of the second one of the plurality of second of calibration patterns.

14. The apparatus of claim 1, wherein the determination unit is configured to determine a first orientation of a first one of the plurality of first calibration patterns and a second orientation of a second one of the plurality of second calibration patterns.

15. The apparatus of claim 14, wherein the determination unit is configured to determine the first orientation with respect to a first facing branch of the first one of the plurality of first calibration patterns and the second orientation with respect to a second facing branch of the second one of the plurality of second calibration patterns.

16. The apparatus of claim 1, wherein the determination unit is configured to determine a spatial positioning error as between a first one of the plurality of first calibration patterns and a second one of the plurality of second calibration patterns.

17. The apparatus of claim 1, wherein the determination unit is configured to determine the position information with a camera.

18. The apparatus of claim 1, wherein the position information pertains to at least one of:
- an overlap of a first irradiation region corresponding to a first irradiation unit and a second irradiation region of a second irradiation unit;
- a first orientation of the first irradiation unit and/or a second orientation of the second irradiation unit;
- a first distortion of the first irradiation region and/or a second distortion of the second irradiation region; and
- a first scaling of the first irradiation region and/or a second scaling of the second irradiation region.

19. The apparatus of claim 1, wherein one or more correction parameters based on which the at least one irradiation parameter may be adjusted is used to control at least one beam guiding unit of the first and second irradiation units.

* * * * *